US008718668B2

(12) United States Patent
Igval

(10) Patent No.: US 8,718,668 B2
(45) Date of Patent: May 6, 2014

(54) DEVICE AND METHOD FOR TRACKING AN ACCESSED LOCATION OF A NETWORK

(75) Inventor: Jacob Igval, Newtown, PA (US)

(73) Assignee: Motorola Mobility LLC, Chicago, IL (US)

( * ) Notice: Subject to any disclaimer, the term of this patent is extended or adjusted under 35 U.S.C. 154(b) by 1532 days.

(21) Appl. No.: 12/207,557

(22) Filed: Sep. 10, 2008

(65) Prior Publication Data
US 2009/0069035 A1    Mar. 12, 2009

Related U.S. Application Data

(60) Provisional application No. 60/971,160, filed on Sep. 10, 2007.

(51) Int. Cl.
H04W 24/00      (2009.01)
H04W 4/02       (2009.01)
H04W 24/10      (2009.01)
H04W 48/18      (2009.01)
H04W 4/08       (2009.01)
H04W 8/26       (2009.01)
H04L 29/06      (2006.01)
H04L 29/08      (2006.01)

(52) U.S. Cl.
CPC ........... *H04W 4/02* (2013.01); *H04W 24/10* (2013.01); *H04W 48/18* (2013.01); *H04W 4/08* (2013.01); *H04W 4/021* (2013.01); *H04W 4/025* (2013.01); *H04W 8/26* (2013.01); *H04L 63/0263* (2013.01); *H04L 67/24* (2013.01)
USPC ............... 455/456.1; 455/456.3; 455/453; 455/414.2; 455/404.2; 455/440

(58) Field of Classification Search
USPC ............. 455/456.1, 456.3, 453, 414.2, 404.2, 455/440
See application file for complete search history.

(56) References Cited

U.S. PATENT DOCUMENTS

| 6,507,914 | B1 | 1/2003 | Cain et al. |
| 6,839,695 | B2 | 1/2005 | Igval |
| 7,068,168 | B2 | 6/2006 | Girshovich et al. |
| 2003/0172306 | A1* | 9/2003 | Cain et al. ..................... 713/201 |

* cited by examiner

Primary Examiner — Nimesh Patel

(57) ABSTRACT

A device comprises an analog signal port, a data packet port, and a control processor comprising circuitry to convert analog audio signals into the data packets and vice versa. The device further comprises an access control module to register network access locations and determine a perimeter within which the accessed location is located when the device is accessing the network. By using the perimeter, the access control module is to receive from a user of the device a verification or a manual entry of a location within the perimeter as the accessed location. The access control module is to determine the received one of the verified location and the manually entered location as the accessed location and provide the determined accessed location to a location-based service through the data packet port.

20 Claims, 3 Drawing Sheets

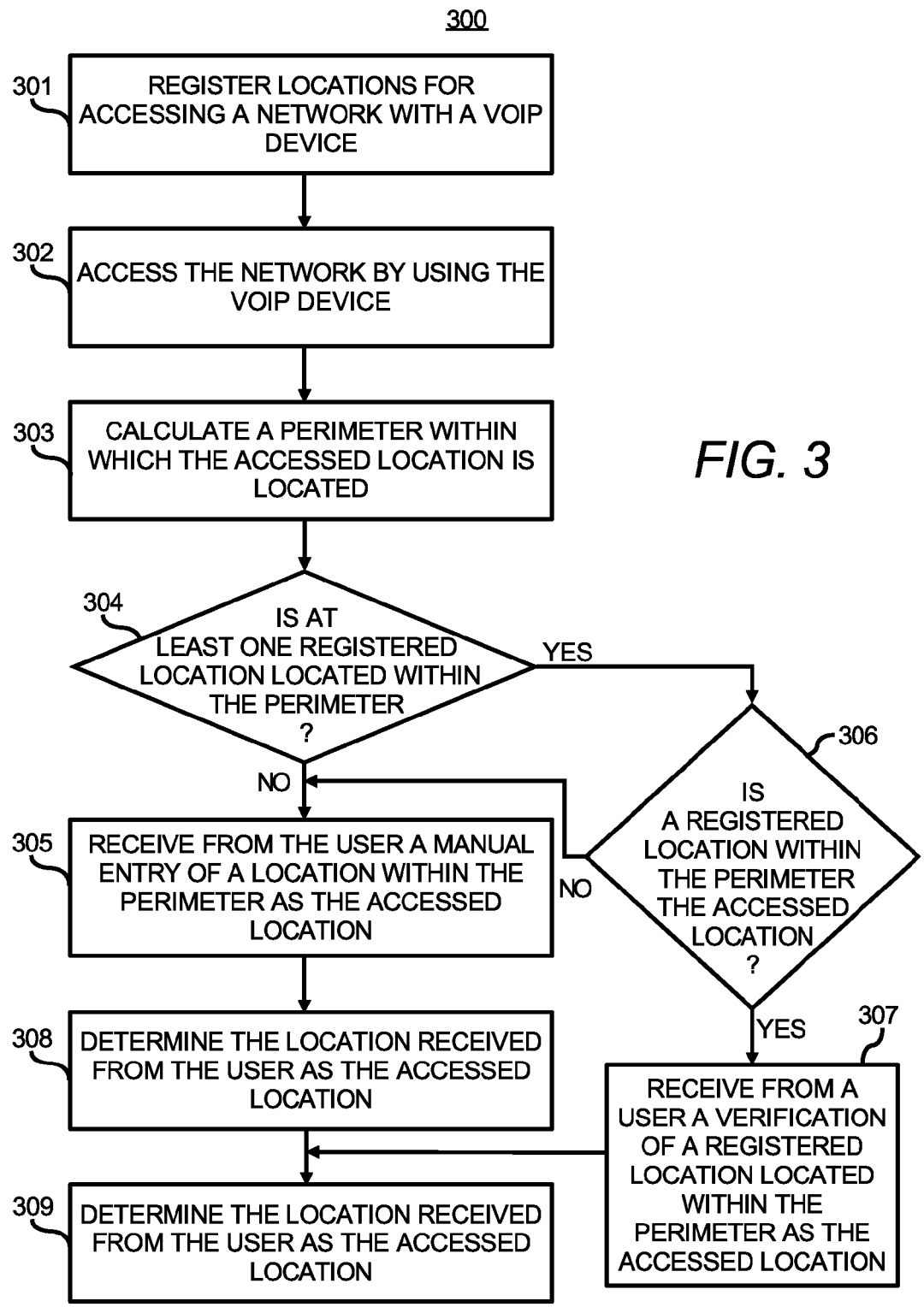

DEVICE AND METHOD FOR TRACKING AN ACCESSED LOCATION OF A NETWORK

PRIORITY

This application claims the benefit of the filing date of U.S. Provisional Patent Application No. 60/971,160, filed on Sep. 10, 2007, the disclosure of which is incorporated herein by reference in its entirety.

BACKGROUND

Voice over Internet protocol (VoIP) allows telephone calls to be made from any location around the world via a VoIP network such as the Internet. Users make and receive telephone calls via a VoIP network by connecting portable VoIP devices to the VoIP network, where each VoIP device operates as an interface between a telephone and a VoIP network. As referred to in this disclosure, a VoIP device may be any reasonably suitable device that converts analog audio signals into data packets and vice versa and communicates the analog audio signals and the data packets through an analog audio port and a data packet port, respectively. An analog terminal adapter (ATA) and a multimedia terminal adapter (MTA) are examples of VoIP devices.

As referred to in this disclosure, data packets each comprise a header field and a data field, where the header fields are used for processing data packets and may each include at least one of a source Internet protocol (IP) address, a destination IP address, a time, and any other data related to processing of data packets including cyclic redundancy check (CRC) bits.

As to a specific example of how a VoIP device is used, a user of the VoIP device may first sign up for a VoIP service through a service provider, where the VoIP device may have an assigned telephone number. The user may make and receive telephone calls through the assigned telephone number regardless of where the user is located around the world by accessing a VoIP network using the VoIP device. Users may plug one or more telephones into a VoIP device, and the telephones will operate, usually transparently, on the VoIP network.

Recently, use of VoIP telephone service has been gaining popularity over telephone calls made through a plain old telephone service (POTS). One of the strengths of VoIP telephone services is their costs. They have been becoming a relatively less expensive way of making and receiving telephone calls in comparison to telephone calls made through the POTS. However, tracing of call origins available in POTS for location-based services such as dispatching emergency services and law enforcement has not been made available in VoIP networks due to the size and constantly changing nature of VoIP networks and portability of VoIP devices.

BRIEF DESCRIPTION OF DRAWINGS

The embodiments of the invention will be described in detail in the following description with reference to the following figures.

FIG. 3 illustrates a method for tracking a location of a VoIP device accessing a network and using the tracked location for providing location-based services according to an embodiment of the invention.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

While telephone calls may be made from any location around the world via a VoIP network such as the Internet, it is desirable to have information as to a location where a VoIP device is connected to the network for providing location-based services such as dispatching emergency services, law enforcement, billing by service providers, determining routing paths to and from the accessed location, etc.

The location where the VoIP device is accessing the VoIP network is calculated by using any reasonably suitable way for calculating an access location on the VoIP network such as use of a ping signal, a triangulation method, etc. If the calculation does not pinpoint the exact access location, at least a perimeter within which the access location lies (that is, the calculation is not able to pinpoint the exact access location but identifies a physical boundary in the network within which the access location) may be obtained.

Afterwards, a user of the device may be prompted to perform one of a verification and a manual entry of a location within the perimeter as the access location. The verification may comprise verifying one of the at least one registered location located within the perimeter as the access location.

Figure 1:
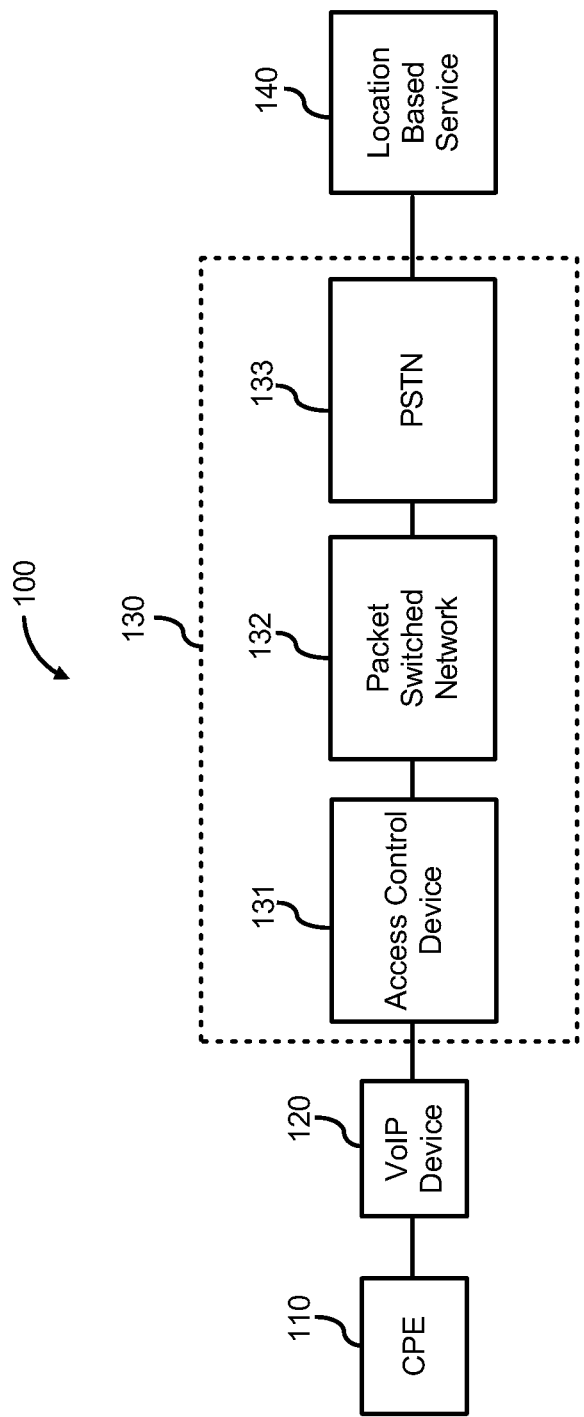
FIG. 1 illustrates a system for tracking a location of a VoIP device accessing a network and using the tracked location for location-based services according to an embodiment of the invention.

Turning now to FIG. 1, shown therein is a system 100 for tracking a location where a VoIP device 120 accesses a network 130 and using the tracked location for providing location-based services according to an embodiment of the invention. It should be understood that the system 100 may include additional components and that some of the components described herein may be removed and/or modified without departing from a scope of the system 100.

A customer premise equipment (CPE) 110 may be any reasonably suitable device that converts audio sounds into analog audio signals and vice versa such as a telephone, a microphone, a speaker, a television, a computer, etc. The VoIP device 120 communicates analog audio signals to and from the CPE 110, communicates data packets to and from the network 130, and converts the analog audio signals into the data packets and vice versa. The VoIP device 120 may be any reasonably suitable VoIP device such as ATAs and MTAs.

The VoIP device 120 may access the network 130 for making or receiving telephone calls. The network 130 may comprise an access control device 131 of a service provider and one or more networks such as a packet-switched network 132 and a public switched telephone network (PSTN) 133 as shown in FIG. 1. In accessing the network 130, a registration of one or more locations where the VoIP device 120 may access the network 130 may be performed through the access control device 131 of the service provider.

The registration of one or more access locations according to an example of the invention may be performed independently of the VoIP device 120 by allowing a registration through a website when users sign up for VoIP service with a service provider or, when users are signing up for VoIP service through a telephone call, a live operator, a voice response system, etc.

When a registration of one or more locations where the VoIP device 120 may access the network 130 is performed through the VoIP device 120 and the access control device 131 of the service provider, the VoIP device 120 becomes a conduit for the registration, and the service provider provides and maintains any necessary registration software/hardware for the registration and may be responsible for storing records of the registrations in the network. Alternatively, the registration of one or more locations where the VoIP device 120 may access the network 130 may be performed through, for instance, a software/hardware of the VoIP device 120.

In both cases, any telephone number assigned by a service provider to the VoIP device 120 may be a separate record from the registered access locations. Thus, when a user makes a telephone call from outside the United States by using the VoIP device 120 with an assigned U.S. telephone number, the assigned U.S. telephone number may show up on a caller identification provided to the call recipient, while the network access location outside the United States may be required to be registered.

When the VoIP device 120 accesses the network 130 after the registration process, the access location (e.g., the street and city address of the access location) is calculated according to any suitable method of calculating an access location on a network such as the methods discussed below.

In calculating the access location, the exact access location may be pinpointed, and the calculated, exact access location may be provided to a location-based service 140. In this case, while the exact calculated access location may be provided to the location-based service 140 automatically, if the calculated access location does not match one of the registered locations, the user may be prompted to register the calculated location as the registered location.

Alternatively, the access location calculation may not be able to pinpoint the exact location and may instead determine a perimeter within which the access location lies, where the calculated perimeter may be provided to the location-based service 140 authorized to receive the information. After determining the perimeter within which the access location lies, the registered locations located within the perimeter are further determined. For instance, the access location calculation may determine that two or more registered locations lie within the perimeter. In such a case, the user may be prompted to select and verify one of the registered locations within the perimeter as the access location.

Even if only one registered location is determined to be within the perimeter, the user may be prompted to verify the registered location as the access location. In making a verification, a user may be required to select the registered location as the access location in response to a display or an audio announcement of one or more registered locations within the access location. However, if none of the displayed or announced one or more registered locations within the access location matches the access location, the user may be allowed to manually enter the access location. After determining the perimeter within which the access location lies, if none of the registered locations lies within the perimeter, the user may be prompted to manually enter a location as the access location. After the manual entry of the location by the user, if the manually entered location is within the perimeter, the manually entered location is determined to be the access location.

After calculating a perimeter within which the access location lies, if a user is unable to verify one of the registered locations within the perimeter or manually enter a location within the perimeter as the access location, the call by the user may be blocked from being transmitted to the recipient and/or terminated. Similarly, if the calculation pinpoints an access location, which does not match one of the registered locations, and the user is unable to register the calculated location after the prompt, the call by the user may be blocked from being transmitted to the recipient and/or terminated.

In prompting the user to register a new access location, the user may be prompted through a voice recording to register a new access location through, for instance, a voice command mechanism, a keypad on the telephone, a touch screen on the MTA device, an email to a personal email account of the user, a regular postal mail to one or more of the already registered access locations of the user, etc.

In providing access location information to the location-based service 140, one or both of the calculated access location and the verified or manually entered access location may be provided to the location-based service 140.

While controlling an access to the network 130 and calculating and forwarding information as to an accessed location in the network 130 to the location-based service 140 have been described above as functions of the access control device 131 of a service provider, any one or more or all of the functions of the access control device 131 and functions of the service provider may be alternatively provided by the VoIP device 120 by providing equivalent functions in the VoIP device. For instance, the VoIP device 120 may control access to the network 130, perform a registration of access locations and any updates thereof, and/or terminate the network access after a failure to properly update the registered access locations.

With respect to the packet-switched network 132 and PSTN 133, after calculating a location of a network access by the VoIP device 120 by either pinpointing the exact location or receiving a user input as to the network access location as described above, the access control device 131 allows transmission of data packets to and from the VoIP device 120 through the packet-switched network 132 and, possibly, through another network, such as the PSTN 133, of the network 130.

While the network 130 in FIG. 1 is shown as having the access control device 131, the packet-switched network 132, and the PSTN 133 according to an embodiment of the invention, it should be understood that the network 130 may include additional components and that some of the components described herein may be removed and/or modified without departing from a scope of the network 130.

In discussing components of the network 130 in more detail, the packet-switched network 132 may be any reasonably suitable network for transmitting and managing data packets in the network based on a header field of each data packet such as the Internet. The PSTN 133 is a network of the world's public circuit-switched telephone networks and converts data packets received from the packet-switched network 132 into analog audio signals before being forwarded to a telephone line of the recipient of the call.

In describing operations of routing data packets through the network 130 in connection with data packets communicated through the VoIP device 120, the data packets may be transferred to and from another VoIP device connected to the packet-switched network 132 directly. Alternatively, in cases of telephone calls, data packets corresponding to a telephone call, may be transferred to and from a telephone user by communicating the data packets through both the packet-switched network 132 and another network such as a public switched telephone network (PSTN) 133 before reaching the other user.

In describing the calculation of an access location of the VoIP device 120 in more detail, the calculation may be performed by any reasonably suitable way of calculating an accessed location in a network such as using a global positioning system (GPS) embedded within the VoIP device 120 to calculate the location, using a ping signal from a source server to analyze a round-trip time and a path that the ping signal takes in reaching the access location and coming back and to calculate the access location based on the analysis, a triangulation method, etc.

As a specific example of a method of calculating the network access location, the triangulation method determines an access location in a network by sending ping signals from several servers around the world and analyzing the paths and the round-trip times that the ping signals take in reaching the access location and coming back to the source servers. More specifically, by using known information as to the locations of the servers, the triangulation method calculates the location of the access location.

As to a number of servers for sending ping signals, more paths that the triangulation take into consideration, and thus more servers sending out the ping signals, more accurate determination of the access location may be made. While using only one server to generate a ping signal may produce a calculation result that determines the access location to be within a certain radius of the server, where the radius is proportional to the round-trip ping time, the calculation of the access location may be further improved by having more servers placed at different locations on the network for generating pings. For instance, three servers strategically located around the world may be used to triangulate the access location and provide a relatively more accurate calculation of the access location.

As to an entity that initiates the calculation of the access location, the calculation of the access location may be initiated by either the network 130 via, for instance, a server on the network 130 or the VoIP device 120 via, for instance, a software and/or hardware on the VoIP device 120. The calculation of the access location may be performed by either the VoIP device 120 (for instance, via an embedded GPS within the VoIP device 120) or by the network 130 through, for instance, a dedicated server in the network 130 for performing a triangulation based on information collected from use of pings sent by multiple servers around the world as described above.

Once the access location is calculated, the calculated access location information may be routed through the network 130 to the location-based service 140. The location-based service 140 may be connected to the packet-switched network 132 through the PSTN 133, and the calculated access location may be transferred through both the packet-switched network 132 and the PSTN 133 before reaching the location-based service 140 as shown in FIG. 1.

When the calculated access location information is transferred through both the packet-switched network 132 and the PSTN 133, the PSTN 133 receives from the packet-switched network 132 data packets corresponding to the calculated access location and converts the received data packets into analog audio signals before being forwarded to a telephone line corresponding to the location-based service 140. Alternatively, the location-based service 140 may be another VoIP device connected to the packet-switched network 132 and may receive the calculated access location information directly from the packet-switched network 132 without having the information transferred through the PSTN 133.

The location-based service 140 may be any reasonably suitable location-based service such as emergency services, law enforcement, a service provider, etc. The location-based service 140 may use the access location information for any location-based service such as dispatching emergency services, law enforcement, billing by service providers, disallowing network access from certain geographic locations to specific VoIP devices, determining routing paths to and from the access location, etc.

For instance, service providers may use the access location information to disallow network access from certain geographic locations to specific VoIP devices or apply different billing rates for network accesses through different access locations of the network 130. Also, the access location information may be used in determining routes for transmitting data packets to and from the access location. An optimization of routes based on the access location information may be especially useful if, for instance, several tiers of the Internet exist and where voice traffic and data traffic follow different paths going from one point to another.

Figure 2:
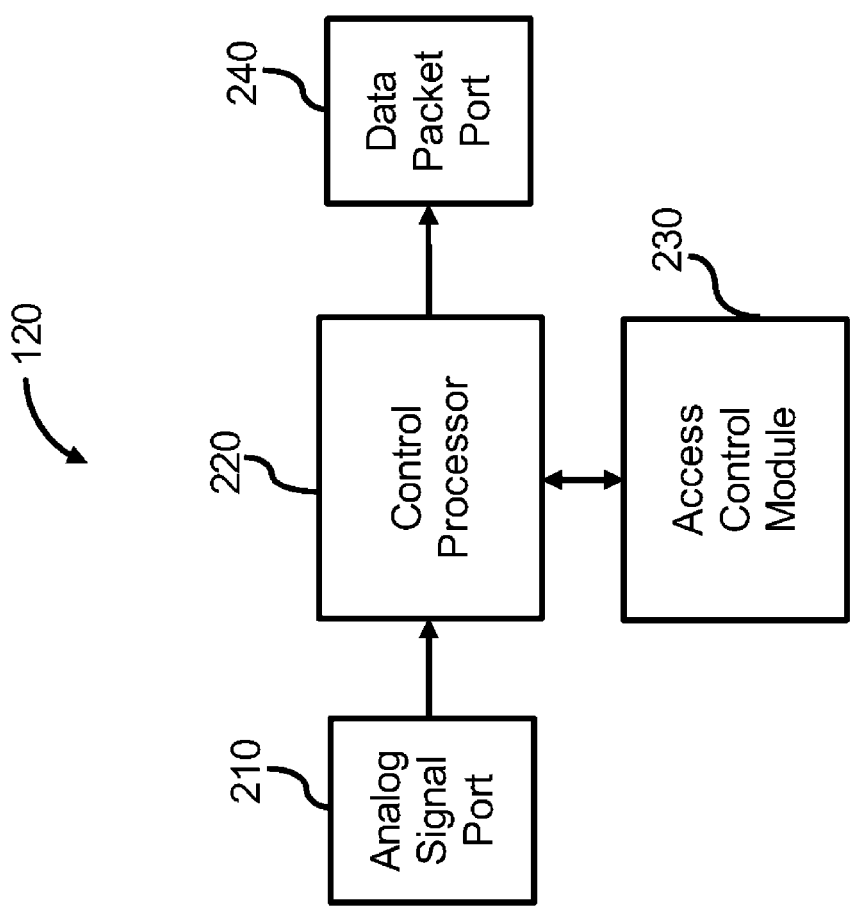
FIG. 2 illustrates a VoIP device comprising an access control module for controlling an access to a network by using registered access locations according to an embodiment of the invention.

Turning now to FIG. 2, shown therein is a VoIP device 120 comprising an access control module 230 for controlling an access to a network by using registered access location information according to an embodiment of the invention. Instead of having the access control device 131 in FIG. 1 as a part of the network 130, the VoIP device 120 incorporates all of the functions of the access control device 131 in the access control module 230. It should be understood that the VoIP device 120 may include additional components and that some of the components described herein may be removed and/or modified without departing from a scope of the VoIP device 120. For instance, the VoIP device 120 may include one or more of a modem, an MTA, a cordless base station and a wireless router.

In describing the VoIP device 120 more specifically, the VoIP device 120 may include an analog signal port 210 and a data packet port 240. The analog signal port 210 may be any reasonably suitable analog signal port for receiving and transmitting analog audio signals and may comprise one port or separate ports for performing the receipt and transmission of analog audio signals, respectively. The data packet port 240 may be any reasonably suitable port for receiving and transmitting data packets and may comprise one port or separate ports for performing the receipt and the transmission of analog audio signals, respectively. A control processor 220 comprises circuitry to convert the analog audio signals into data packets and vice versa and communicates the audio signals through the analog signal port 210 and the data packets through the data packet port 240. The access control module 230 performs all of the above-described functions of the access control device 131 by appropriately controlling the control processor 220 and any one more other components of the VoIP device 120.

Turning now to FIG. 3, shown therein is a method 300 for tracking a location of the VoIP device 120 accessing a network and using the tracked location for location-based services according to an embodiment of the invention. It should be apparent to those of ordinary skill in the art that other steps may be added or existing steps may be removed, modified or rearranged without departing from a scope of the method 300.

At step 301, locations for accessing the network with the VoIP device 120 is registered, for instance, by the access control module 230.

At step 302, the network is accessed by using the VoIP device 120 at a location of the network for communicating data packets of the device, wherein the VoIP device 120 is configured to convert analog audio signals into the data packets and vice versa.

At step 303, a perimeter within which the accessed location is located is calculated.

At step 304, a determination is made as to whether at least one registered location is located within the perimeter.

If none of the registered locations is located within the perimeter, a manual entry of a location within the perimeter is received from the user of the VoIP device 120 at step 305.

If at least one registered location is located within the perimeter, a further determination is made as to whether one of the registered locations located within the perimeter is the accessed location at step 306.

If none of the registered locations located within the perimeter is the accessed location, a manual entry of a location within the perimeter is received from the user of the VoIP device 120 at step 305.

If one of the registered locations located within the perimeter is the accessed location, a verification of one of the registered locations located within the perimeter as the accessed location is received from the user of the VoIP device 120 at step 307.

At step 308, the received one of the verified location and the manually entered location is determined as the accessed location.

At step 309, the determined accessed location is provided to a location-based service.

The above-described operations of tracking a location where the VoIP device 120 accesses the network 130 and using the tracked location for location-based services 140 in reference to exemplary features and embodiments of FIGS. 1-3 may be contained as a computer program product embodied on one or more tangible computer readable storage mediums. The computer program product may exist in a variety of forms both active and inactive. For instance, the computer program product may exist as software program(s) comprised of program instructions in source code, object code, executable code or other formats whether compressed or uncompressed. Exemplary tangible computer readable storage mediums include conventional computer system RAM, ROM, EPROM, EEPROM, and magnetic or optical disks or tapes.

While exemplary features and embodiments of FIGS. 1-3 have been explained within the context of each feature and embodiment, any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A device for accessing a network and tracking an accessed location of the network, the device comprising:
   an analog signal port configured to communicate analog audio signals;
   a data packet port configured to communicate data packets;
   a control processor comprising circuitry to convert the analog audio signals into the data packets and vice versa; and
   an access control module coupled to the control processor and configured to:
   register one or more locations for accessing the network with the device;
   determine a perimeter within which the accessed location is located when the device is accessing the network;
   if at least one of the one or more registered locations is located within the perimeter, receive from a user of the device a verification of one of the at least one registered location located within the perimeter as the accessed location;
   if none of the one or more registered locations is located within the perimeter, receive from the user of the device a manual entry of a location within the perimeter as the accessed location; and
   determine the received one of the verified location and the manually entered location as the accessed location and provide the determined accessed location to a location-based service through the data packet port.

2. The device of claim 1, wherein the determination of the perimeter of the accessed location comprises a calculation of the perimeter of the accessed location by another device on the network and use of the calculated perimeter by the access control module.

3. The device of claim 1, wherein the one or more registered locations comprises multiple registered locations and the verification of one of the at least one registered location located within the perimeter as the accessed location comprises selecting one of the multiple registered locations as the accessed location.

4. The device of claim 1, wherein the access control module is further configured to receive from the user of the device a manual entry of a location within the perimeter if none of the at least one registered location located within the perimeter matches the accessed location.

5. The device of claim 1, wherein the access control module is further configured to terminate the access to the network if the user of the device fails to verify or manually enter a location within the perimeter after being prompted for performing one of the verification and the manual entry or if the accessed location is determined to be an unauthorized location.

6. A method for tracking a location of a device accessing a network, the method comprising:
   registering one or more locations for accessing the network with the device;
   accessing the network by using the device at a location of the network for communicating data packets of the device, wherein the device is configured to convert analog audio signals into the data packets and vice versa;
   calculating a perimeter within which the accessed location is located;
   if at least one of the one or more registered locations is located within the perimeter, receiving from a user of the device a verification of one of the at least one registered location located within the perimeter as the accessed location;
   if none of the one or more registered locations is located within the perimeter, receiving from the user of the device a manual entry of a location within the perimeter as the accessed location;
   determining the received one of the verified location and the manually entered location as the accessed location; and
   providing the determined accessed location to a location-based service.

7. The method of claim 6, wherein the one or more registered locations comprises multiple registered locations and the verification of one of the at least one registered location located within the perimeter as the accessed location comprises selecting one of the multiple registered locations as the accessed location.

8. The method of claim 6, further comprising using at least one of the calculated perimeter of the accessed location and the received one of the verified location and the manually entered location for at least one of dispatching an emergency service and a law enforcement service.

9. The method of claim 6, further comprising using at least one of the calculated perimeter of the accessed location and the received one of the verified location and the manually entered location for determining charges payable to a service operator for a telephone call made through the device.

10. The method of claim 6, further comprising terminating the access to the network if the user of the device fails to verify or manually enter a location within the perimeter after being prompted for performing one of the verification and the manual entry or if the accessed location is determined to be an unauthorized location.

11. The method of claim 6, wherein the calculation of the perimeter of the accessed location and determining the received one of the verified location and the manually entered location as the accessed location are performed by another device on the network.

12. The method of claim 6, further comprising using the determined accessed location for determining routes in the network used for communicating the data packets through the accessed location.

13. The method of claim 6, wherein determining the received one of the verified location and the manually entered location as the accessed location comprises determining the manually entered location as the accessed location if the manually entered location is within the perimeter.

14. The method of claim 6, further comprising receiving from the user of the device a manual entry of a location within the perimeter if none of the at least one registered location located within the perimeter matches the accessed location.

15. A non-transitory computer readable medium having a computer program product for tracking a location of a device accessing a network embodied thereon, the computer program product comprising instructions for:
- registering one or more locations for accessing the network with the device;
- accessing the network by using the device at a location of the network for communicating data packets of the device, wherein the device is configured to convert analog audio signals into the data packets and vice versa, each of the data packets including a header field and a data field;
- calculating a perimeter within which the accessed location is located;
- if at least one of the one or more registered locations is located within the perimeter, receiving from a user of the device a verification of one of the at least one registered location located within the perimeter as the accessed location;
- if none of the one or more registered locations is located within the perimeter, receiving from the user of the device a manual entry of a location within the perimeter as the accessed location; and
- determining the received one of the verified location and the manually entered location as the accessed location and providing the determined accessed location to a location-based service.

16. The non-transitory computer readable medium of claim 15, wherein the one or more registered locations comprises multiple registered locations and the verification of one of the at least one registered location located within the perimeter as the accessed location comprises selecting one of the multiple registered locations as the accessed location.

17. The non-transitory computer readable medium of claim 15, further comprising instructions for terminating the access to the network if the user of the device fails to verify or manually enter a location within the perimeter after being prompted for performing one of the verification and the manual entry or if the accessed location is determined to be an unauthorized location.

18. The non-transitory computer readable medium of claim 15, wherein the calculation of the perimeter of the accessed location and determining the received one of the verified location and the manually entered location as the accessed location are performed by another device on the network.

19. The non-transitory computer readable medium of claim 15, wherein determining the received one of the verified location and the manually entered location as the accessed location comprises determining the manually entered location as the accessed location if the manually entered location is within the perimeter.

20. The non-transitory computer readable medium of claim 15, further comprising instructions for receiving from the user of the device a manual entry of a location within the perimeter if none of the at least one registered location located within the perimeter matches the accessed location.

\* \* \* \* \*